US010578306B2

(12) United States Patent
Purcell et al.

(10) Patent No.: US 10,578,306 B2
(45) Date of Patent: Mar. 3, 2020

(54) LIQUID FUEL CARTRIDGE UNIT FOR GAS TURBINE COMBUSTOR AND METHOD OF ASSEMBLY

(71) Applicant: General Electric Company, Schenectady, NY (US)

(72) Inventors: Timothy James Purcell, Centerville, OH (US); Ronald James Chila, Greenfield Center, NY (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 330 days.

(21) Appl. No.: 15/625,044

(22) Filed: Jun. 16, 2017

(65) Prior Publication Data
US 2018/0363907 A1    Dec. 20, 2018

(51) Int. Cl.
| F23R 3/28 | (2006.01) |
| F23D 11/38 | (2006.01) |
| F23R 3/34 | (2006.01) |
| F02C 7/22 | (2006.01) |
| F23R 3/04 | (2006.01) |
| F23R 3/36 | (2006.01) |

(52) U.S. Cl.
CPC .............. *F23R 3/286* (2013.01); *F02C 7/22* (2013.01); *F23D 11/38* (2013.01); *F23R 3/04* (2013.01); *F23R 3/283* (2013.01); *F23R 3/343* (2013.01); *F23R 3/36* (2013.01); *F23R 3/28* (2013.01); *F23R 3/34* (2013.01); *F23R 2900/00004* (2013.01)

(58) Field of Classification Search
CPC .... F23R 3/28; F23R 3/32; F23R 3/283; F23R 3/286; F23R 3/34; F23R 3/343; F23R 3/346; F23R 3/36; F02C 7/22; F23D 11/38; F23D 11/383; F23D 11/40
See application file for complete search history.

(56) References Cited

U.S. PATENT DOCUMENTS

| 3,668,869 A | 6/1972 | DeCorso et al. |
| 4,833,878 A | 5/1989 | Sood et al. |
| 5,408,825 A | 4/1995 | Foss et al. |
| 5,437,159 A | 8/1995 | Ansart et al. |
| 5,657,632 A | 8/1997 | Foss |

(Continued)

OTHER PUBLICATIONS

"How to Bend Tubes and Sections", HiTech Alloys, Copyright 2002-2008, printed Jan. 25, 2017 from http://www.hitechalloys.com/hitechalloys_005.htm.

*Primary Examiner* — Craig Kim
(74) *Attorney, Agent, or Firm* — Charlotte C. Wilson; James W. Pemrick

(57) ABSTRACT

A liquid fuel cartridge unit for a gas turbine combustor includes a cartridge tip having an aft plate and a side wall circumscribing the aft plate. First injection ports are defined through the side wall, and second injection ports are defined through the side wall upstream of the first injection ports, relative to fuel flow through the cartridge tip. Nested conduits extend into the cartridge tip with the concentric conduits defining therebetween respective flow passages. The first injection ports are in fluid communication with a first flow passage, and the second injection ports are in fluid communication with a second flow passage. A method of assembling the liquid fuel cartridge unit is also provided.

18 Claims, 8 Drawing Sheets

(56) References Cited

U.S. PATENT DOCUMENTS

| | | | |
|---|---|---|---|
| 5,778,676 A * | 7/1998 | Joshi | F23D 11/101 |
| | | | 239/405 |
| 5,924,275 A | 7/1999 | Cohen et al. | |
| 6,397,602 B2 | 6/2002 | Vandervort et al. | |
| 8,136,359 B2 | 3/2012 | Stuttaford et al. | |
| 8,522,554 B2 | 9/2013 | Intile et al. | |
| 8,671,691 B2 | 3/2014 | Boardman et al. | |
| 9,188,341 B2 | 11/2015 | McMasters et al. | |
| 9,217,570 B2 | 12/2015 | Parsania et al. | |
| 9,261,279 B2 | 2/2016 | Westmoreland et al. | |
| 9,366,440 B2 | 6/2016 | Berry | |
| 9,383,098 B2 | 7/2016 | Means et al. | |
| 9,476,592 B2 | 10/2016 | Berry | |
| 2009/0014561 A1 | 1/2009 | McMasters et al. | |
| 2010/0293954 A1 * | 11/2010 | Widener | F23D 14/48 |
| | | | 60/740 |
| 2011/0314827 A1 * | 12/2011 | Khosla | F23R 3/14 |
| | | | 60/742 |
| 2012/0174590 A1 * | 7/2012 | Krull | F23N 5/082 |
| | | | 60/772 |
| 2013/0086910 A1 * | 4/2013 | Khan | F23R 3/14 |
| | | | 60/737 |
| 2013/0174563 A1 * | 7/2013 | Boardman | F23R 3/14 |
| | | | 60/772 |
| 2015/0135716 A1 | 5/2015 | Ginessin et al. | |
| 2016/0033138 A1 | 2/2016 | Graham et al. | |
| 2016/0146460 A1 * | 5/2016 | Stewart | F23R 3/14 |
| | | | 60/737 |
| 2016/0201897 A1 * | 7/2016 | Snyder | F23R 3/36 |
| | | | 239/418 |

* cited by examiner

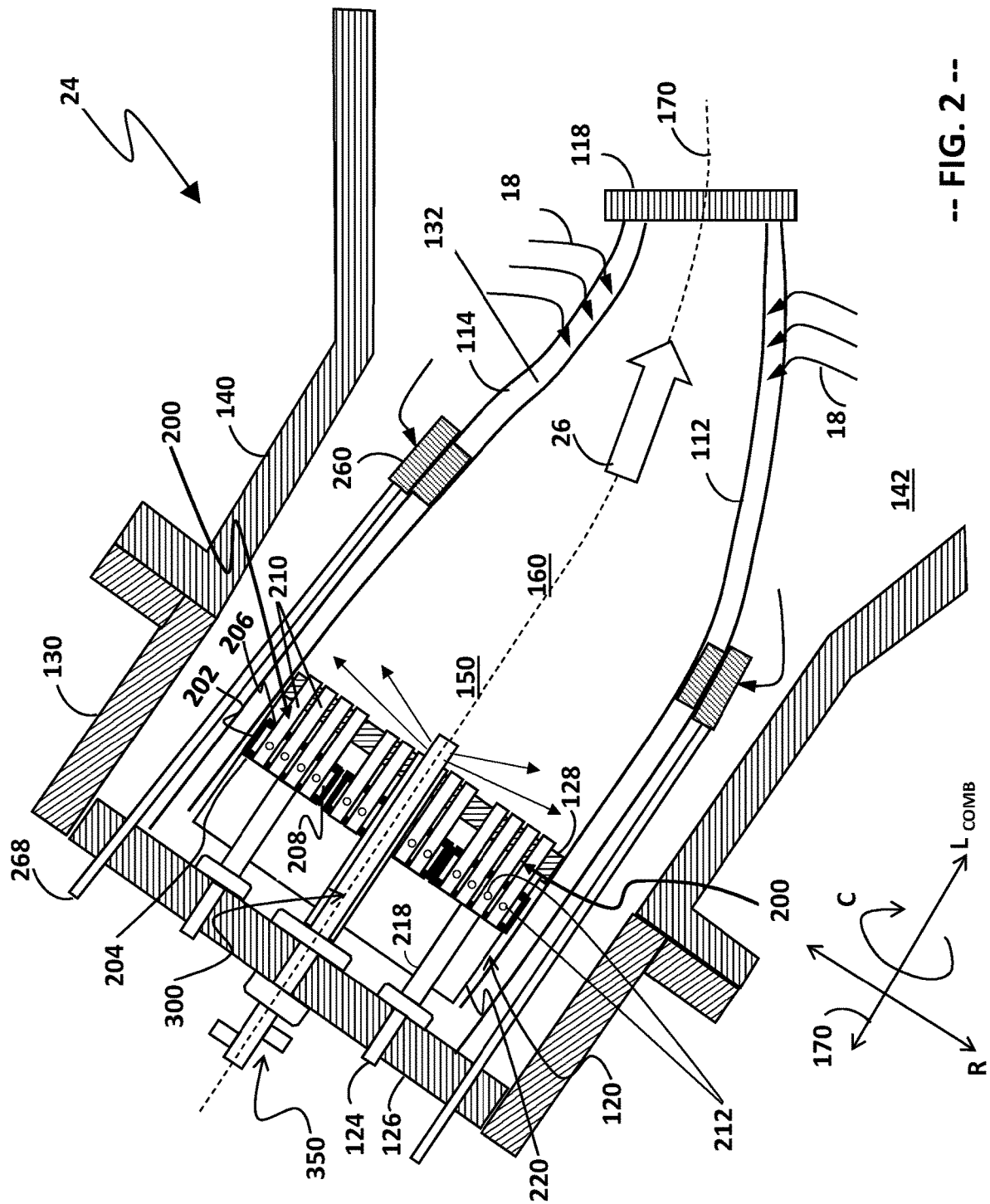
-- FIG. 2 --

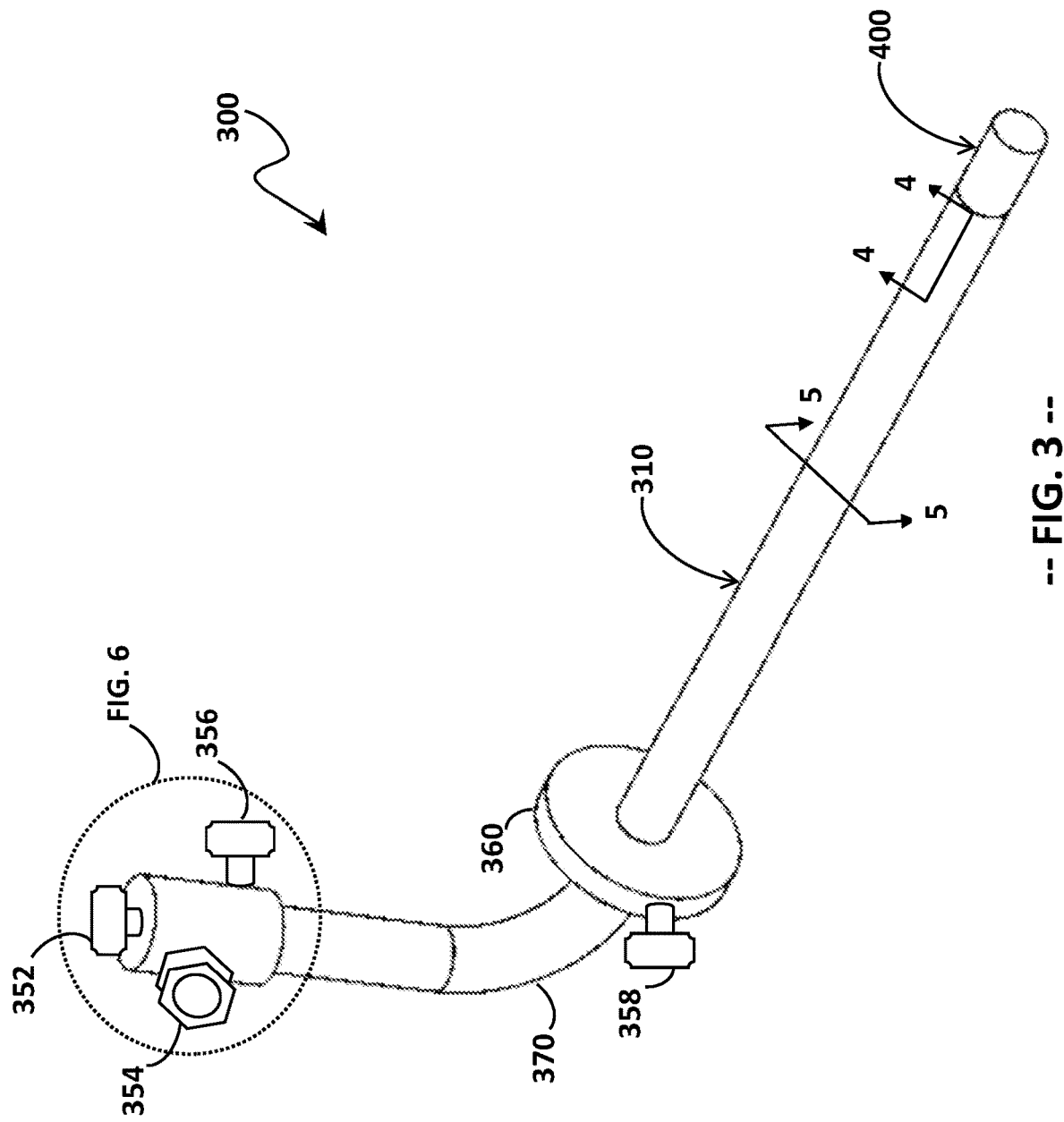

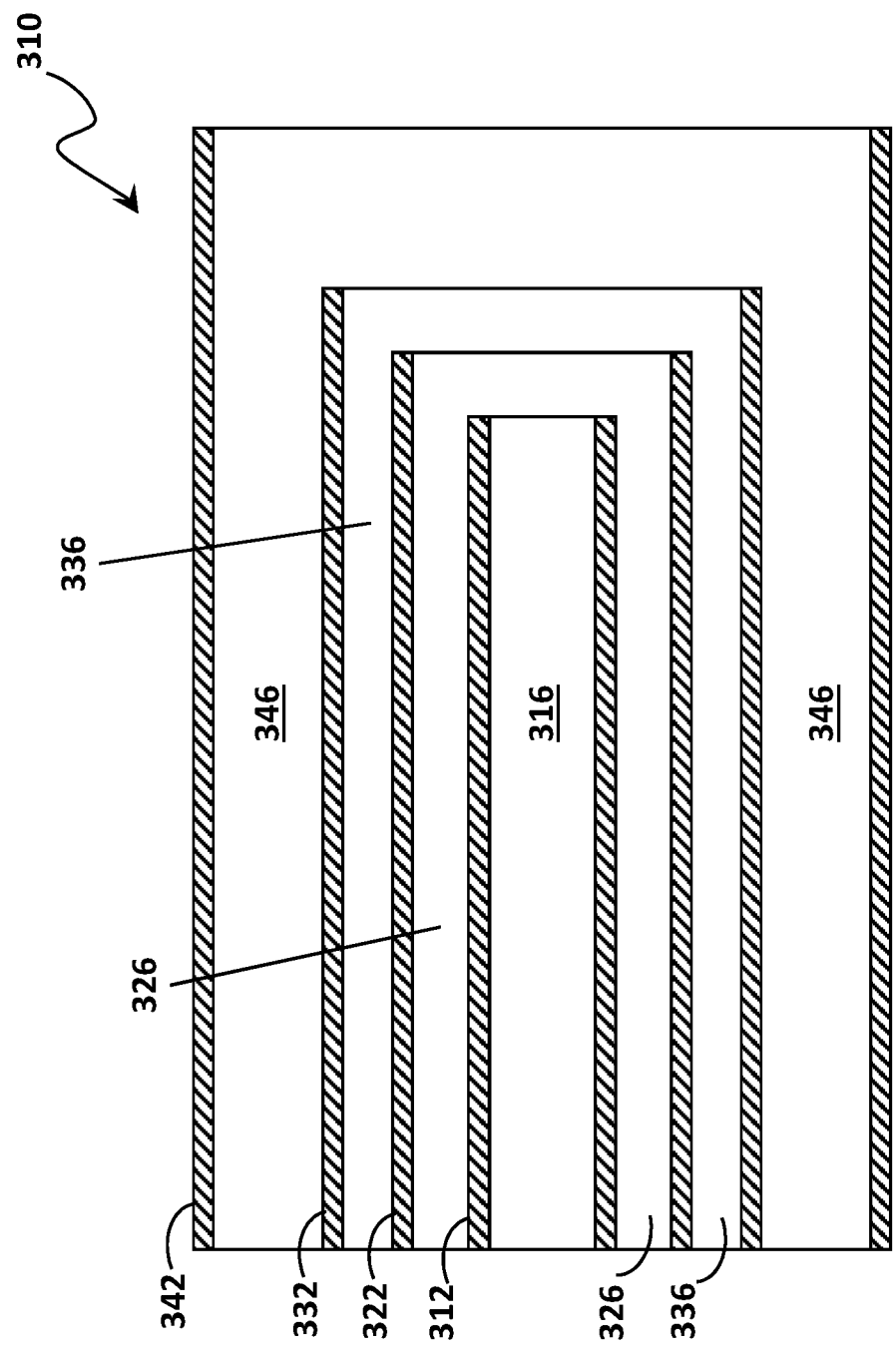
-- FIG. 4 --

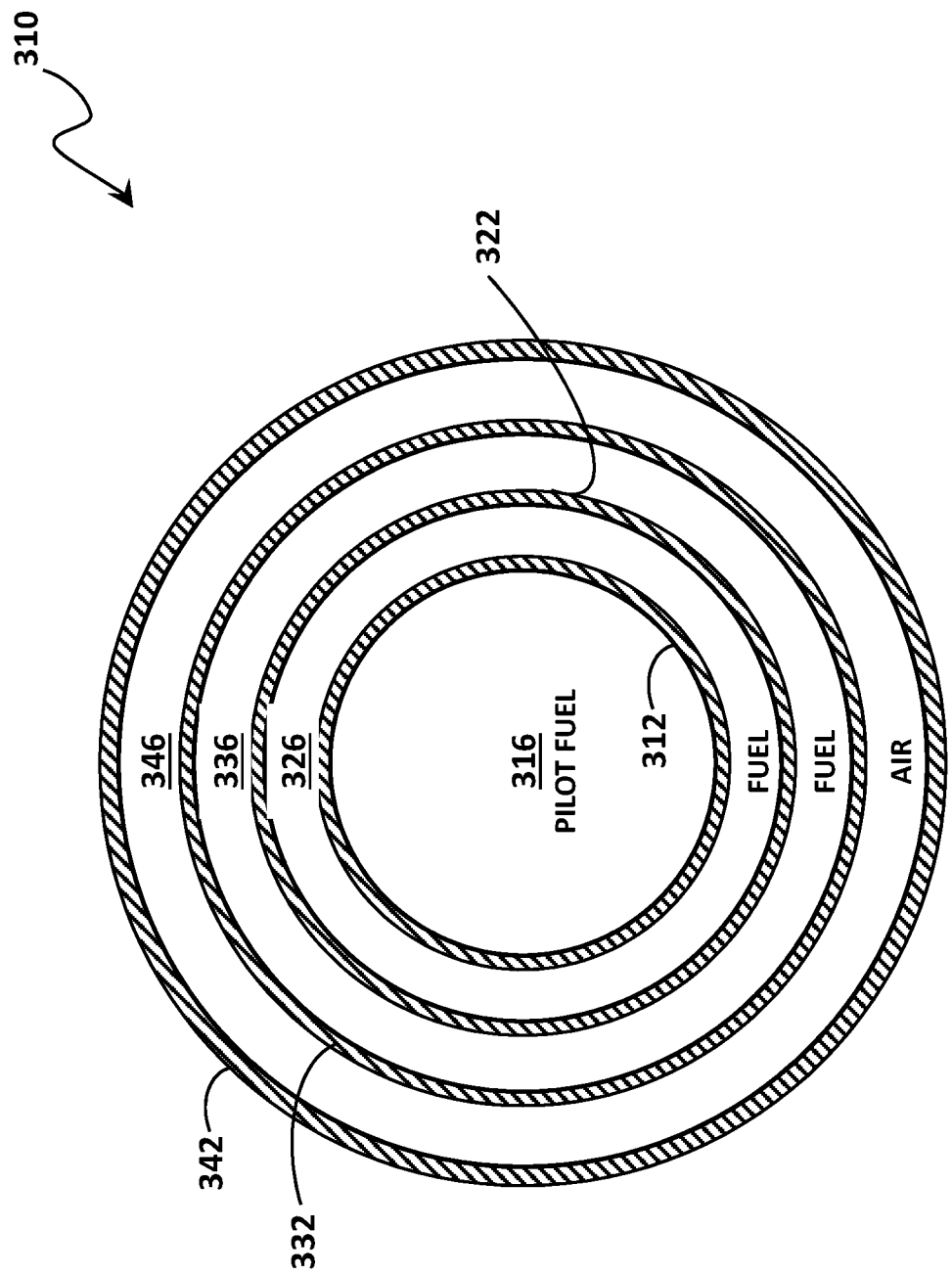
-- FIG. 5 --

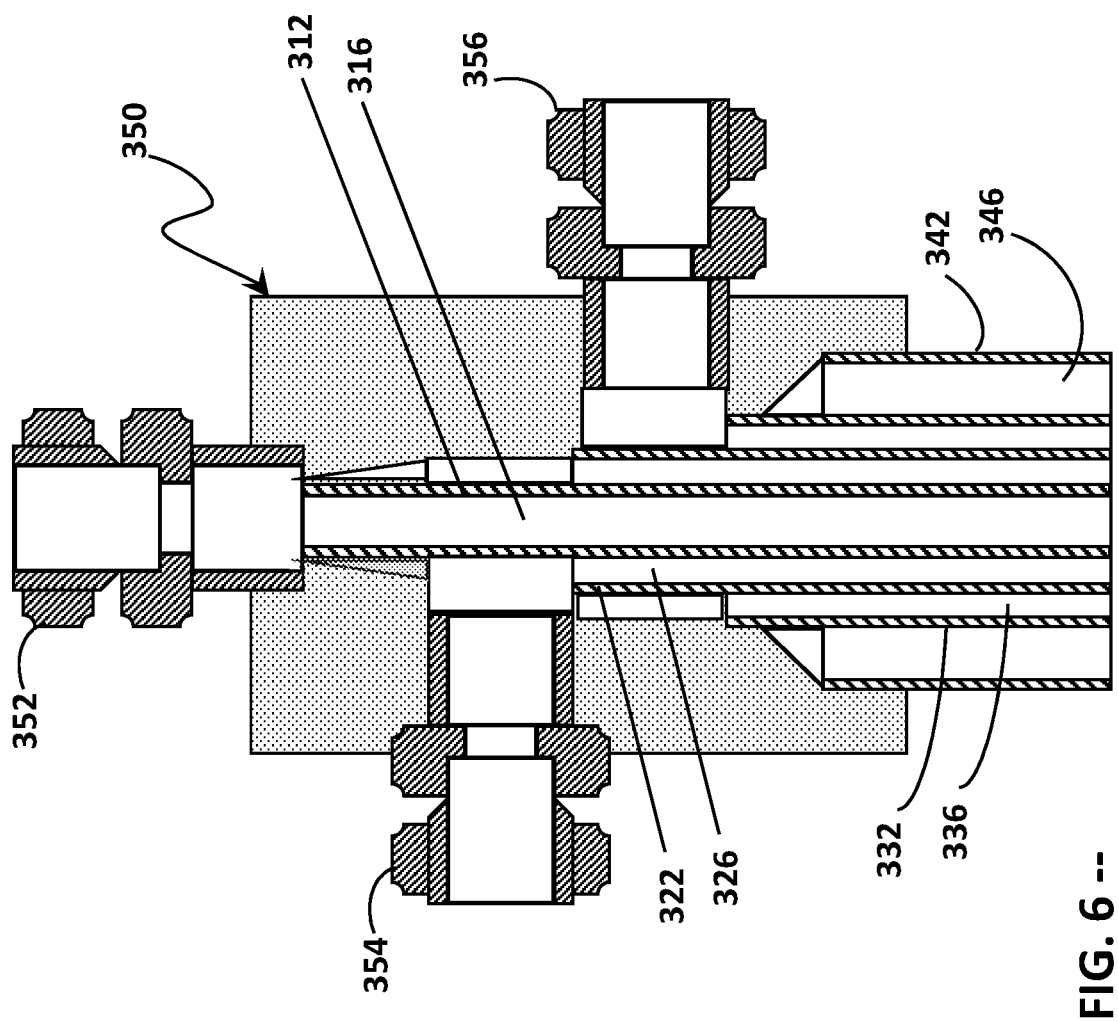
-- FIG. 6 --

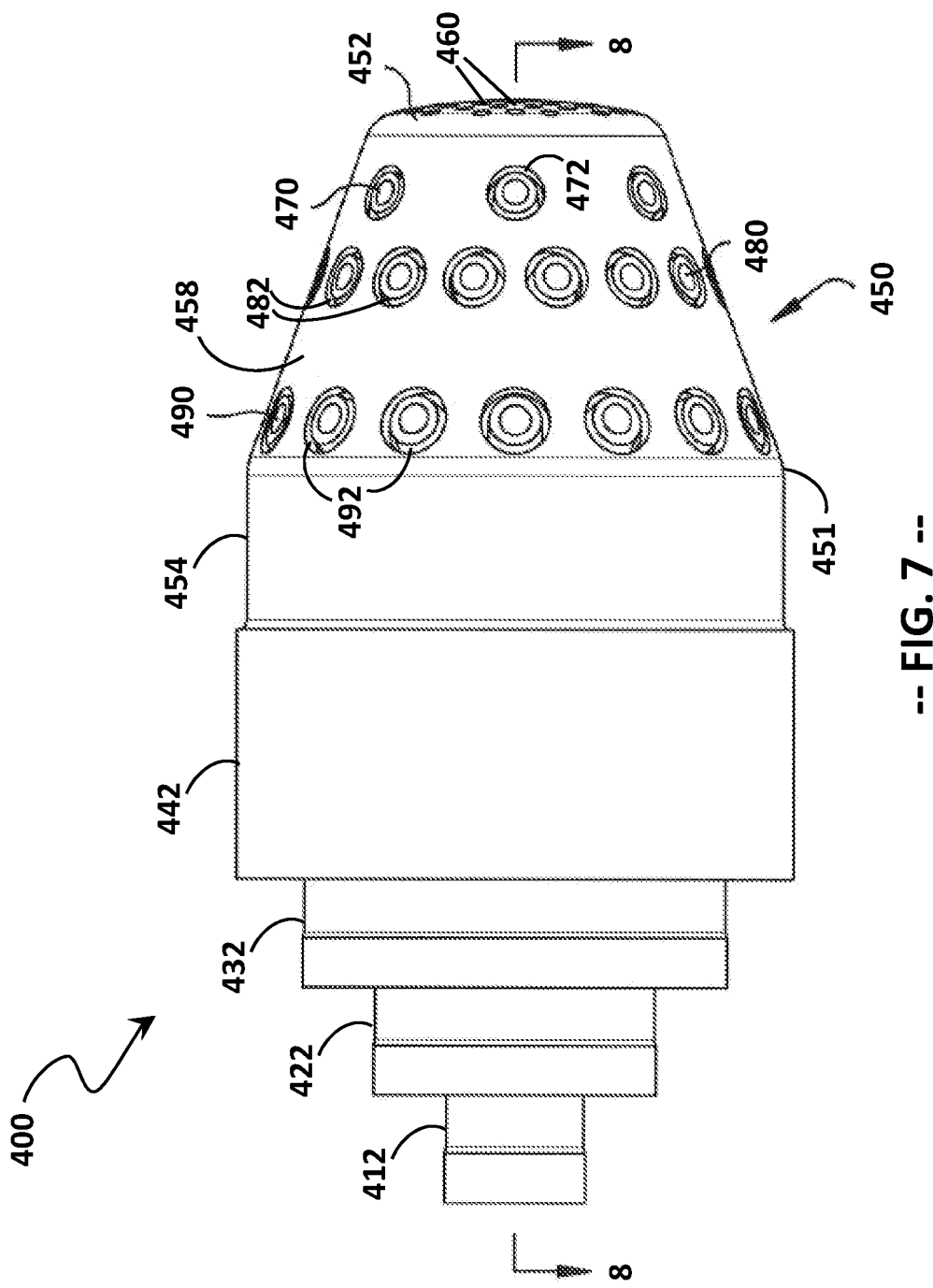

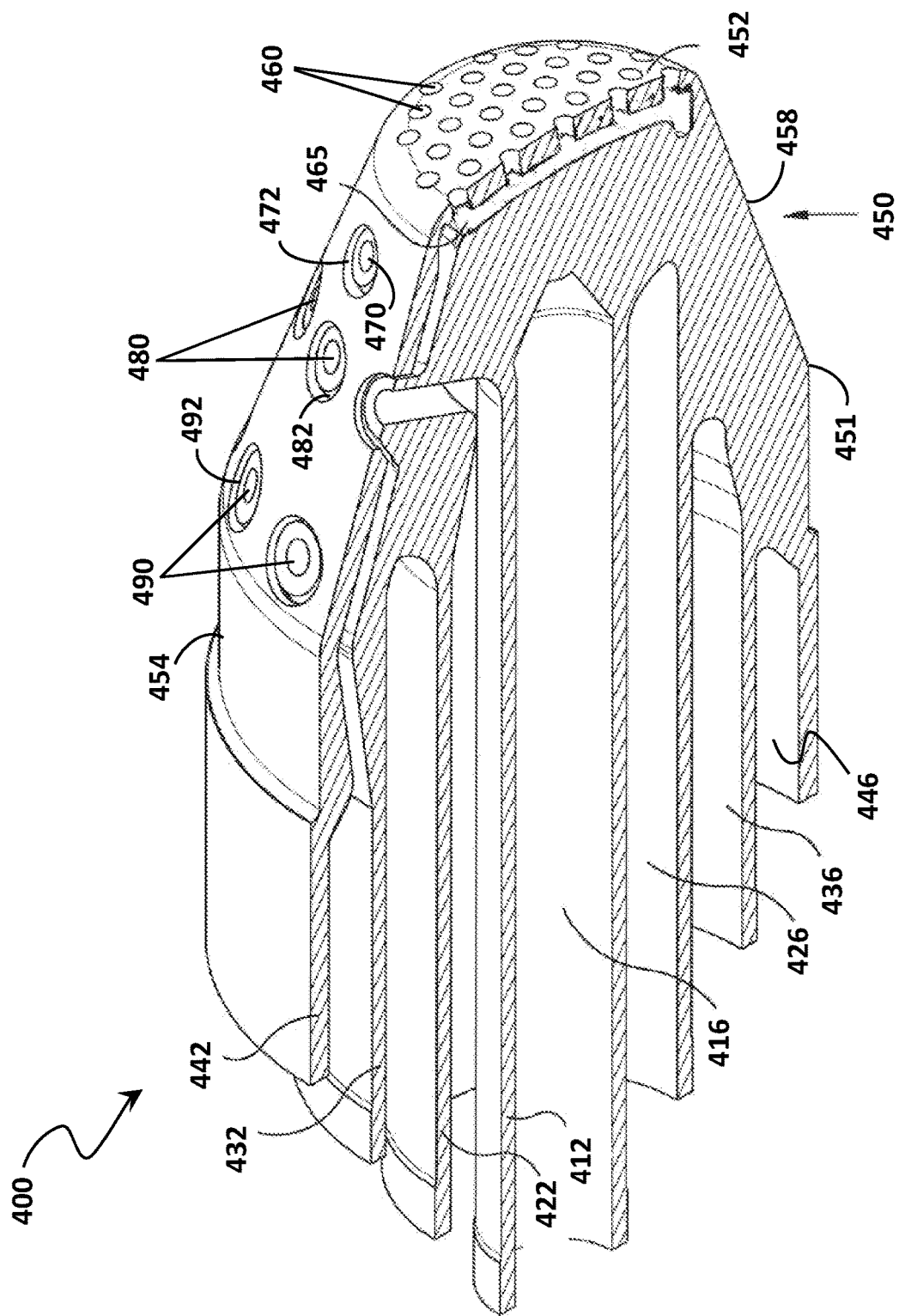
-- FIG. 8 --

LIQUID FUEL CARTRIDGE UNIT FOR GAS TURBINE COMBUSTOR AND METHOD OF ASSEMBLY

TECHNICAL FIELD

The present disclosure relates generally to gas turbine combustors and, more particularly, to a liquid fuel cartridge unit for introducing liquid fuel into a gas turbine combustor and a method of assembling the liquid fuel cartridge unit.

BACKGROUND

A gas turbine generally includes a compressor section, a combustion section having a combustor, and a turbine section. The compressor section progressively increases the pressure of the working fluid to supply a compressed working fluid to the combustion section. The compressed working fluid is routed through one or more fuel nozzles that extend axially within a forward, or head, end of the combustor. A fuel is combined with the flow of the compressed working fluid to form a combustible mixture. The combustible mixture is burned within a combustion chamber to generate combustion gases having a high temperature, pressure, and velocity. The combustion chamber is defined by one or more liners or ducts that define a hot gas path through which the combustion gases are conveyed into the turbine section. In a can-annular type combustion system, multiple combustion cans (each having its own fuel nozzle(s) and liner) produce combustion gases that drive the turbine section.

The combustion gases expand as they flow through the turbine section to produce work. For example, expansion of the combustion gases in the turbine section may rotate a shaft connected to a generator to produce electricity. The turbine may also drive the compressor by means of a common shaft or rotor.

In the combustor section, the fuel nozzles may operate solely on gaseous fuel, solely on liquid fuel, or simultaneously on gaseous fuel and liquid fuel. In many instances, a power-generation plant may experience sustained periods when it is necessary to operate using only liquid fuel.

One challenge commonly associated with liquid fuel operation is the tendency of the liquid fuel to coke within the fuel nozzle at temperatures that are only moderately elevated over ambient temperatures and significantly below the flame temperature within the combustion chamber. Another challenge with liquid fuel nozzles is designing the liquid fuel injection ports to produce a uniform spray pattern, such that the liquid fuel is quickly atomized and combusted. An associated challenge is locating the fuel nozzle properly within the combustor head end to prevent the liquid fuel spray from reaching the combustor liner, where coking may occur and lead to thermal stress. Additionally, most liquid fuel nozzles rely on a single liquid fuel circuit, which provides limited flexibility in the operation of the liquid fuel nozzle. Finally, the tip of the liquid fuel cartridge must be cooled to mitigate thermal stresses.

Therefore, an improved liquid fuel cartridge for delivering a liquid fuel to a combustion chamber is needed in the industry.

SUMMARY

The present disclosure is directed to a liquid fuel cartridge unit for a gas turbine combustor. The liquid fuel cartridge unit includes a cartridge tip having an aft plate and a side wall circumscribing the aft plate. A first plurality of injection ports is defined through the side wall, and a second plurality of injection ports is defined through the side wall upstream of the first plurality of injection ports, relative to a flow of fuel through the cartridge tip. A plurality of concentric conduits extends into the cartridge tip with the concentric conduits defining therebetween respective flow passages. The first plurality of injection ports is in fluid communication with a first flow passage, and the second plurality of injection ports is in fluid communication with a second flow passage.

According to another aspect, a method of assembling a liquid fuel cartridge unit for a combustor is provided. The method includes providing a liquid fuel cartridge trip having a plurality of concentric conduits extending axially upstream therefrom. The method further includes: joining a downstream end of a first supply tube to a first conduit of the plurality of conduits; joining a downstream end of a second supply tube to a second conduit of the plurality of conduits, such that the second supply tube circumscribes the first supply tube; and joining a downstream end of a third supply tube to a third conduit of the plurality of conduits, such that the third supply tube circumscribes the second supply tube to thereby form a concentric tube assembly. The method also includes: bending the concentric tube assembly around a die at a bend location upstream of the cartridge tip; and joining an upstream end of each of the first supply tube, the second supply tube, and the third supply tube to a fluid manifold hub. The first supply tube, the second supply tube, and the third supply tube are supported solely by the cartridge tip and the fluid manifold hub.

BRIEF DESCRIPTION OF THE DRAWINGS

A full and enabling disclosure of the present products and methods, including the best mode thereof, directed to one of ordinary skill in the art, is set forth in the specification, which refers to the appended figures, in which:

FIG. 2 is a cross-sectional view of a combustor, which may be used in the gas turbine assembly of FIG. 1;

FIG. 3 is a perspective view of a liquid fuel cartridge unit, as may be used in the combustor of FIG. 2;

FIG. 4 is a cross-sectional view of a downstream portion of the liquid fuel cartridge unit of FIG. 3, taken along cutline 4-4;

FIG. 5 is a cross-sectional view of the liquid fuel cartridge unit of FIG. 3, taken along an axial plane 5-5 of the liquid fuel cartridge unit between a cartridge tip and a fluid manifold hub;

FIG. 6 is an enlarged perspective view of the fluid manifold hub of the liquid fuel cartridge unit of FIG. 3;

FIG. 7 is a side view of the cartridge tip of the liquid fuel cartridge of FIG. 3; and FIG. 8 is a cross-sectional side view of the cartridge tip of FIG. 7.

DETAILED DESCRIPTION

Figure 1:
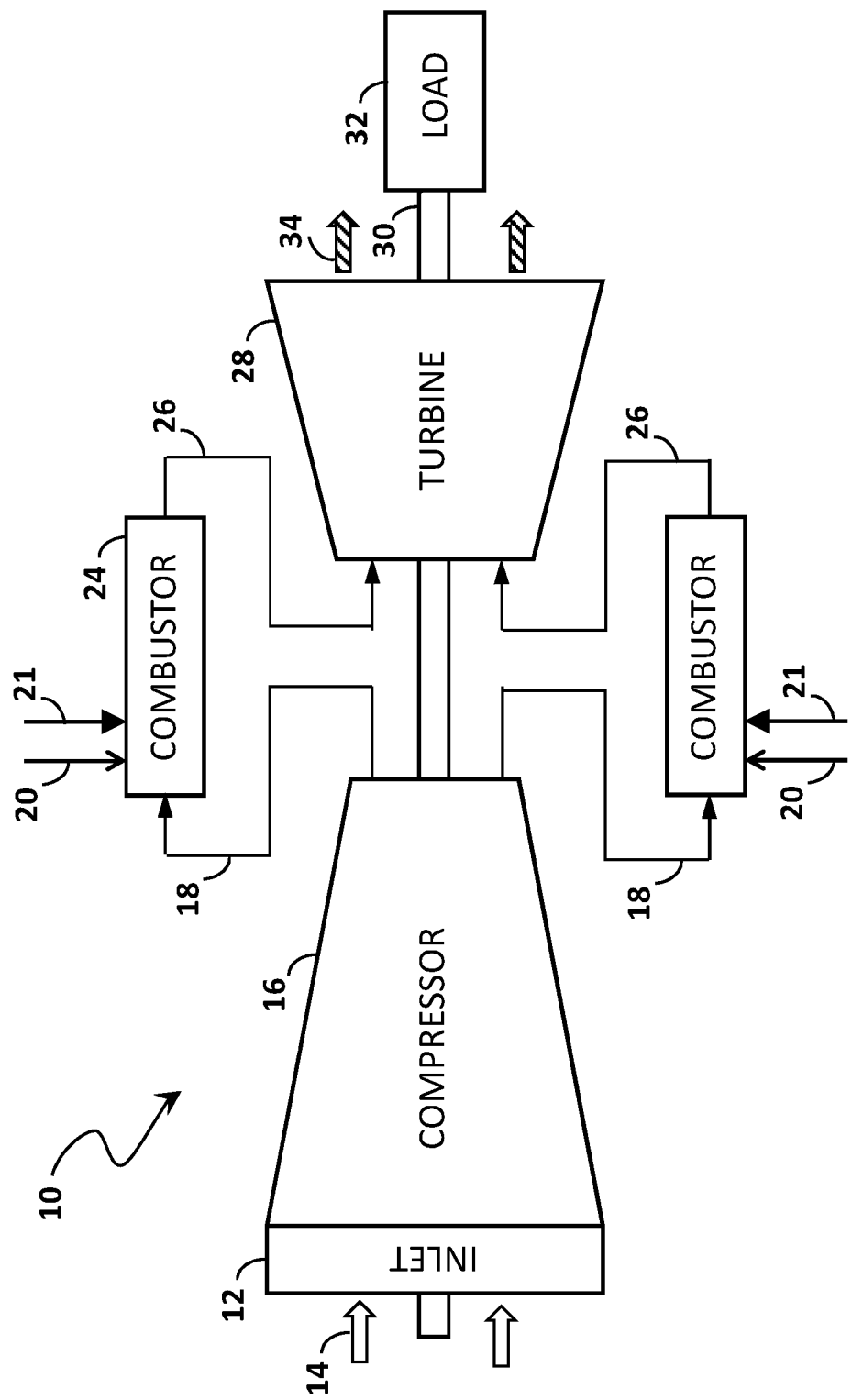
FIG. 1 is a schematic diagram of a gas turbine assembly, which may employ one or more fuel injectors, as described herein.

The following detailed description illustrates a gas turbine combustor, a liquid fuel cartridge unit for delivering liquid fuel to the gas turbine combustor, and a method of assembling a liquid fuel cartridge unit for a gas turbine combustor, by way of example and not limitation. The description enables one of ordinary skill in the art to make and use the liquid fuel cartridge unit. The description includes what is presently believed to be the best modes of making and using the present liquid fuel cartridge unit. An exemplary liquid fuel cartridge unit is described herein as being coupled to a combustor of a heavy-duty gas turbine assembly used for electrical power generation. However, it is contemplated that the liquid fuel cartridge unit described herein may have general application to a broad range of systems in a variety of fields other than electrical power generation.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The term "radially" refers to the relative direction that is substantially perpendicular to an axial centerline of a particular component, and the term "predominantly radially" refers to the relative direction of a flow that is oblique, or transverse, to the centerline of a particular component. The term "axially" refers to the relative direction that is substantially parallel to an axial centerline of a particular component. As used herein, the term "radius" (or any variation thereof) refers to a dimension extending outwardly from a center of any suitable shape (e.g., a square, a rectangle, a triangle, etc.) and is not limited to a dimension extending outwardly from a center of a circular shape. Similarly, as used herein, the term "circumference" (or any variation thereof) refers to a dimension extending around a center of any suitable shape (e.g., a square, a rectangle, a triangle, etc.) and is not limited to a dimension extending around a center of a circular shape.

Each example is provided by way of explanation, not limitation of the invention. In fact, it will be apparent to those skilled in the art that modifications and variations can be made in the present liquid fuel cartridge unit, without departing from the scope or spirit of the present disclosure. For instance, features illustrated or described as part of one embodiment may be used on another embodiment to yield a still further embodiment. Thus, it is intended that the present disclosure encompasses such modifications and variations as fall within the scope of the appended claims and their equivalents. Although exemplary embodiments of the present liquid fuel cartridge unit and method will be described generally in the context of a combustor incorporated into a gas turbine for purposes of illustration, one of ordinary skill in the art will readily appreciate that embodiments of the present disclosure may be applied to any combustor incorporated into any turbomachine and is not limited to a gas turbine combustor, unless specifically recited in the claims.

Reference will now be made in detail to various embodiments of the present liquid fuel cartridge unit and method, one or more examples of which are illustrated in the accompanying drawings. The detailed description uses numerical and letter designations to refer to features in the drawings. Like or similar designations in the drawings and description have been used to refer to like or similar parts.

FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a gaseous fuel 20 from a gaseous fuel supply system and/or a liquid fuel 21 from a liquid fuel supply system to form a combustible mixture within one or more combustors 24. The combustible mixture is burned to produce combustion gases 26 having a high temperature, pressure, and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section (not shown) that connects the turbine 28 to an exhaust stack downstream from the turbine. The exhaust section may include, for example, a heat recovery steam generator (not shown) for cleaning and extracting additional heat from the exhaust gases 34 prior to release to the environment.

The combustors 24 may be any type of combustor known in the art, and the present invention is not limited to any particular combustor design unless specifically recited in the claims. For example, the combustor 24 may be a can type (sometime called a can-annular type) of combustor.

FIG. 2 is a schematic representation of a combustion can 24, as may be included in a can annular combustion system for the heavy-duty gas turbine 10. In a can annular combustion system, a plurality of combustion cans 24 (e.g., 8, 10, 12, 14, 16, or more) are positioned in an annular array about the shaft 30 that connects the compressor 16 to the turbine 28.

As shown in FIG. 2, the combustion can 24 includes a liner 112 that contains and conveys combustion gases 26 to the turbine. The liner 112 defines a combustion chamber within which combustion occurs. The liner 112 may have a cylindrical liner portion and a tapered transition portion that is separate from the cylindrical liner portion, as in many conventional combustion systems. Alternately, the liner 112 may have a unified body (or "unibody") construction, in which the cylindrical portion and the tapered portion are integrated with one another. Thus, any discussion of the liner 112 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The liner 112 may be surrounded by an outer sleeve 114, which is spaced radially outward of the liner 112 to define an annulus 132 between the liner 112 and the outer sleeve 114. The outer sleeve 114 may include a flow sleeve portion at the forward end and an impingement sleeve portion at the aft end, as in many conventional combustion systems. Alternately, the outer sleeve 114 may have a unified body (or "unisleeve") construction, in which the flow sleeve portion and the impingement sleeve portion are integrated with one another in the axial direction. As before, any discussion of the outer sleeve 114 herein is intended to encompass both convention combustion systems having a separate flow sleeve and impingement sleeve and combustion systems having a unisleeve outer sleeve.

A head end portion 120 of the combustion can 24 includes one or more fuel nozzles 200. The fuel nozzles 200, as illustrated, may be described as bundled tube fuel nozzles. Each fuel nozzle 200 includes a housing 202 extending in an axial direction, which circumscribes a plurality of mixing tubes 210 oriented in parallel to one another. Each tube 210 has an inlet end, an outlet end, and one or more fuel injection holes 212 defined through the tube wall between the inlet end and the outlet end.

The housing 202 is joined to an upstream plate 204 and a downstream plate 206, such that a fuel plenum 208 is defined between the housing 202 and the plates 204, 206. The fuel plenum 208 is in fluid communication with a fuel supply conduit 218 and the fuel injection holes 212 of each tube 210. The fuel supply conduit 218 of each fuel nozzle 122 is in fluid communication with a respective fuel inlet 124. The fuel inlets 124 may be formed through an end cover 126 at a forward end of the combustion can 24.

The head end portion 120 of the combustion can 24 is at least partially surrounded by a forward casing 130, which is physically coupled and fluidly connected to a compressor discharge case 140. The compressor discharge case 140 is fluidly connected to an outlet of the compressor 16 and defines a pressurized air plenum 142 that surrounds at least a portion of the combustion can 24. Air 18 flows from the compressor discharge case 140 into the annulus 132 at an aft end of the combustion can, via openings defined in the outer sleeve 114. Because the annulus 132 is fluidly coupled to the head end portion 120, the air flow 18 travels upstream from the aft end 118 of the combustion can 24 to the head end portion 120, where the air flow 18 reverses direction and enters the fuel nozzles 200. An inlet flow conditioner 220 having a plurality of openings or slots (not separately shown) may be used to condition or homogenize the flow entering the fuel nozzles 200.

The tubes 210 have inlet ends defined through corresponding openings (not shown) in the upstream plate 204. Air 18 passes through the inlet ends of the tubes 210 and, during gaseous fuel operation, mixes with fuel passing through the fuel injection holes 212 from the fuel plenum 208. The downstream (or outlet) ends of the tubes 210 extend through a unified combustor cap 128 (or individual plates corresponding to the size and shape of the upstream plates 204 for each fuel nozzle 200).

During gaseous fuel operation, fuel 20 and compressed air 18 are introduced by the fuel nozzles 200 into a primary combustion zone 150 at a forward end of the liner 112, where the fuel and air are combusted to form combustion gases 26. In the illustrated embodiment, the fuel and air are mixed within the fuel nozzles 200 (e.g., in a premixed fuel nozzle). In other embodiments, the fuel and air may be separately introduced into the primary combustion zone 150 and mixed within the primary combustion zone 150 (e.g., as may occur with a diffusion nozzle). Reference made herein to a "first fuel/air mixture" should be interpreted as describing both a premixed fuel/air mixture and a diffusion-type fuel/air mixture, either of which may be produced by fuel nozzles 200. The combustion gases 26 travel downstream toward the aft end 118 of the combustion can 24, the aft end 118 being represented by an aft frame of the combustion can 24.

When the combustor 24 is operating on gaseous fuel, additional fuel and air may be introduced by one or more fuel injectors 260 into a secondary combustion zone 160, where the fuel and air are ignited by the combustion gases from the primary combustion zone 150 to form a combined combustion gas product stream 26. The fuel injectors 260 receive fuel from a fuel supply line 268 and air from the high-pressure air plenum 142. Such a combustion system having axially separated combustion zones is described as an "axial fuel staging" (AFS) system, and the downstream injectors 260 may be referred to as "AFS injectors."

When the combustion can 24 is operated solely on liquid fuel, the liquid fuel 21 and compressed air 18 are introduced by a liquid fuel cartridge unit 300 into the primary combustion zone 150 at a forward end of the liner 112, where the liquid fuel and air are combusted to form combustion gases 26. The liquid fuel and air are separately introduced into the primary combustion zone 150 and mixed within the primary combustion zone 150 to produce a diffusion-style flame.

In the illustrated embodiment, the liquid fuel cartridge unit 300 is co-axial with a longitudinal axis of the combustor 24. By having a centrally located liquid fuel cartridge unit 300 (as opposed to localized liquid fuel cartridges installed within each fuel nozzle 200), the surface area available for the mixing tubes 210 is maximized.

In at least one embodiment, the bundled tube fuel nozzles 200 are unfueled during liquid fuel operation. As a result, air flows through the individual tubes 210 of the bundled tube fuel nozzles 200 and produces a plurality of small air streams flowing in a direction generally parallel to the longitudinal axis of the combustor 24.

The liquid fuel cartridge unit 300 includes a cartridge tip 400 having a plurality of fuel injection ports 470, 480, 490 (shown in more detail in FIGS. 7 and 8) that inject streams of liquid fuel 21 in one or more directions transverse, or oblique, to the air streams originating from the tubes 210 of the unfueled bundled tube fuel nozzles 200. The large number of small air streams help to atomize the liquid fuel 21 and facilitate its combustion, while helping to ensure that the liquid fuel droplets do not reach the inner surface of the liner 112.

Additionally, during dedicated liquid fuel operation, the one or more AFS fuel injectors 260 may remain unfueled. In this case, the unfueled AFS injectors 260 direct relatively large streams of air into an area that, in gaseous fuel operation, is the secondary combustion zone 160. In this area, downstream of the primary combustion zone 150, the air from the unfueled AFS injectors 260 effectively churns and mixes the combustion products generated by the liquid fuel cartridge unit 300, such that the combustion products exiting the combustor aft frame 118 resemble those originating from a premixed flame, which is characterized by having a greater degree of mixedness and a higher velocity as compared with those produced by an unimpeded diffusion flame.

FIGS. 3 through 5 illustrate the liquid fuel cartridge unit 300 in greater detail, while FIG. 6 illustrates a fluid manifold hub 350 located at an upstream end of the liquid fuel cartridge unit 300. The liquid fuel cartridge unit 300 includes a supply tube assembly 310 having a downstream end to which the cartridge tip 400 is attached. The fluid manifold hub 350 is attached to the upstream end of the supply tube assembly 310, and a flange 360 circumscribes the supply tube assembly 310 at a position nearer to the fluid manifold hub 350 than the cartridge tip 400. The fluid manifold hub 350 concentrically surrounds the supply tube assembly 310 and includes a pilot fuel inlet 352, a first fuel inlet 354, and a second fuel inlet 356.

The supply tube assembly 310 includes a number of nested supply tubes, defining therebetween a number of flow passages. In at least one embodiment, the supply tubes may be concentric with one another. As best understood with reference to the exemplary embodiment shown in FIGS. 4 and 5, the supply tube assembly 310 is provided with a first supply tube 312, a second supply tube 322 circumferentially surrounding the first supply tube 312, a third supply tube 332 circumferentially surrounding the second supply tube 322, and a fourth supply tube 342 circumferentially surrounding the third supply tube 332. A first flow passage 316 is defined within the first supply tube 312; a second flow passage 326 is defined between the outer surface of the first supply tube 312 and the inner surface of the second supply tube 322; a third flow passage 336 is defined between the outer surface of the second supply tube 322 and the inner surface of the third supply tube 332; and a fourth flow passage 346 is defined between the outer surface of the third supply tube 332 and the inner surface of the fourth supply tube 342.

Air flows into the fourth flow passage 346, via an air inlet 358 in the flange 360 (FIG. 3). The air in the fourth flow passage 346 provides a degree of thermal insulation (cooling) the supply tube assembly 310, which helps to minimize coking of the liquid fuel. A protective sheath 362 (shown in FIG. 4) circumferentially surrounds the fourth supply tube 342 along a length of the fourth supply tube 342 upstream of the flange 360, the protective sheath 362 extending from the flange 360 to the fluid manifold hub 350. The protective sheath 362 defines a "dead" cavity—that is, a cavity through which no fluid flows.

To facilitate installation and fuel delivery, the supply tube assembly 310 may be provided with a bend 370 at a location upstream of the cartridge tip 400. The bend 370 is nearer to the upstream ends of the supply tubes 312, 322, 332, 342 and the fluid manifold hub 350 than to the downstream ends of the supply tubes 312, 322, 332, 342 and the cartridge tip 400. In other words, the bend 370 is proximate the upstream ends of the supply tubes 312, 322, 332, 342. The bend 370 may define an approximate right angle (90-degrees+/−5-degrees) or any other angle suitable for delivering fuel to the fluid manifold hub 350. To bend the supply tubes 312, 322, 332, 342 while maintaining their internal spacing, the supply tubes 312, 322, 332, 342 are filled with a removable material, as will be discussed further herein.

Referring now to FIG. 6, the first flow passage 316 is in flow communication with a source of pilot fuel, via a pilot fuel inlet 352 on the fluid manifold hub 350. The second flow passage 326 and the third flow passage 336 are in flow communication with a source of liquid fuel (or a liquid fuel/water mixture), via a first fuel inlet 354 and a second fuel inlet 356, respectively. The pilot fuel inlet 352 is aligned coaxially with the first supply tube 312. The first fuel inlet 354 and the second fuel inlet 356 are disposed opposite one another and are aligned in a transverse direction relative to the second supply tube 322 and the third supply tube 332, respectively. Other arrangements of the pilot fuel inlet 352, the first fuel inlet 354, and the second fuel inlet 356 may instead be employed, as needs dictate.

FIG. 7 shows a perspective view, and FIG. 8 shows a cross-sectional view of the cartridge tip 400 of the liquid fuel cartridge unit 300. In the exemplary embodiment shown, the cartridge tip 400 includes four nested conduits 412, 422, 432, 442 that deliver their respective fluids (e.g., fuel or air) through nested flow passages 416, 426, 436, 446 toward or to the downstream end of the cartridge tip 400. In other embodiments, at least three nested conduits 412, 422, 432 may be employed. To facilitate assembly, the conduits 412, 422, 432, 442 have different lengths from longest to shortest, respectively.

The outermost conduit (e.g., the fourth conduit 442) is coupled to a cylindrical portion 454 of the cartridge tip 400, which may or may not have a diameter smaller than that of the outermost conduit. The cylindrical portion 454 extends axially between the outermost conduit 442 and a frustoconical portion 450 of the cartridge tip 400. The frustoconical portion 450 has a base perimeter that joins the cylindrical portion 454 and that has a first diameter equal to that of the cylindrical portion. The frustoconical portion 450 has a downstream end opposite the base perimeter. The downstream end may be referred to as an aft plate 452, which has a second diameter that is smaller than the first diameter. A circumferential side wall 458 extends axially between the base perimeter and the aft plate 452. The aft plate 452, the circumferential side wall 458, and, optionally, the cylindrical portion 454 may be coated with a thermal barrier coating.

The circumferential side wall 458 defines therethrough one or more rows of injection ports 470, 480, 490. A first set of injection ports 470 is proximate the aft plate 452. A second set of injection ports 480 is upstream of the first set of injection ports 470, and a third set of injection ports 490 is upstream of the second set of injection ports 480. Each injection port 470, 480, 490 defines an aperture through which a fluid (e.g., fuel or a fuel/water mixture) flows, and each port 470, 480, 490 is at least partially circumferentially surrounded by an air vent 472, 482, 492, respectively. As used herein, the term "injection port" should be understood as embodying one or more injection apertures or nozzles (e.g., simplex nozzles).

The first set of injection ports 470 has fewer injection ports than the second set of injection ports 480, while the second set of injection ports 480 and the third set of injection ports 490 may be equal in number. Each injection port 470 in the first set of injection ports has a first size. Each injection port 480 in the second set of injection ports has a second size. Each injection port 490 in the third set of injection ports has a third size. In one embodiment, as illustrated, the first size is smaller than the second size, and the second size is smaller than the third size.

The circumferential positioning of the injection ports 470, 480, and/or 490 may be optimized to balance the mixing of the liquid fuel and air with the desire for penetration of the liquid fuel across a given area (e.g., an area downstream of the cap 128. Fuel from the injection ports 470, 480, and 490, which encounters air streams from a large number of the mixing tubes 210, achieves greater mixing but less penetration in a radial direction, and the opposite is also true. For that reason, it may be desirable, in some instances, to align some of the injection ports 470, 480, and/or 490 with spaces between adjacent bundled tube fuel nozzles 200 to increase penetration. To that end, the injection ports 470, 480, and/or 490 may be arranged with non-uniform spacing between adjacent ports, or the injection ports 470, 480, and/or 490 may be uniformly spaced about the circumference of the cartridge tip 400. Moreover, although each set of injection ports 470, 480, and 490 is shown as being arranged along a single axial plane, it should be understood that the injection ports of one or more sets 470, 480, or 490 may be disposed in more than one axial plane.

The first set of injection ports 470 is in fluid communication with the first flow passage 416, which is fluidly connected to the first flow passage 316 of the first fuel supply tube 312. In an exemplary embodiment, the first fuel supply tube 312 is in flow communication with a source of pilot fuel.

The second set of injection ports 480 is in fluid communication with the second flow passage 426, which is fluidly connected to the second flow passage 326 of the second fuel supply tube 322. In an exemplary embodiment, the second fuel supply tube 322 is in flow communication with a source of liquid fuel (or a liquid fuel/water mixture).

The third set of injection ports 490 is in fluid communication with the third flow passage 436, which is fluidly connected to the third flow passage 336 of the third fuel supply tube 332. In an exemplary embodiment, the third fuel supply tube 332 is in flow communication with a source of liquid fuel (or a liquid fuel/water mixture). The source of liquid fuel (or a liquid fuel/water mixture) may be common between the second fuel supply tube 322 and the third fuel supply tube 332.

The fourth flow passage 446 is in flow communication with a source of compressed air, via the fourth supply tube 346. The compressed air flows through the fourth flow passage 446 along the perimeter of the cartridge tip 400 to provide cooling thereto. A portion of the compressed air flows through the air vents 472, 482, 492 around the injection ports 470, 480, 490, respectively, while a second portion of the compressed air is directed to an air chamber 465 adjacent the aft plate 452. Air from the air chamber 465 flows through a plurality of air apertures 460 disposed in the aft plate 452, the air apertures 460 being in flow communication with the fourth flow passage 446.

The cartridge tip 400 may be manufactured using additive manufacturing, such as a metal powder additive manufacturing system or other additive manufacturing system, depending on the materials used. More details about the manufacturing of the cartridge tip 400 may be found in commonly assigned U.S. patent application Ser. No. 15/384,725, filed Dec. 20, 2016, entitled "Additively Manufactured Object with Self-Breaking Support with Fluid Passage," and U.S. patent application Ser. No. 15/434,386, filed Feb. 16, 2017, entitled "Object with Tear-Shaped Suspension for Annular Bodies."

To assemble the liquid fuel cartridge unit 300, the cartridge tip 400 with a plurality of nested conduits 412, 422, 432 (as described above) is provided. A downstream end of the first supply tube 312 is joined to the first conduit 412. A downstream end of the second supply tube 322 is joined to the second conduit 422, such that the second supply tube 322 circumscribes the first supply tube 312. A downstream end of the third supply tube 332 is joined to the third conduit 432, such that the third supply tube 332 circumscribes the second supply tube 322, thereby forming a nested tube assembly 310. The joining of the downstream ends of the supply tubes 312, 322, 332 to the respective conduits 412, 422, 432 may be accomplished by welding or brazing, or by any other joining techniques known in the art.

In some embodiments, a downstream end of the fourth supply tube 342 is joined to a fourth conduit 442, such that the fourth supply tube 342 circumscribes the third supply tube 332. The mounting flange 360 may be provided downstream of the location of the bend 370, and may include the air inlet 358 that is in flow communication with the fourth supply tube 342. The fourth supply tube 342 may be joined to the fourth conduit 442 by welding or brazing, or any other joining techniques known in the art.

To bend the nested tube assembly 310 while maintaining the internal spacing of the supply tubes 312, 322, 332, and, optionally, 342, the supply tubes 312, 322, 332, and, when present, 342, are filled with a removable material. The removable material may be one of resin, powder, granules, pitch, sand, lead, and alloy materials having a melting point less than the boiling point of water. One such exemplary removable alloy material is a eutectic, fusible alloy of 50% bismuth, 26.7% lead, 13.3% tin, and 10% cadmium by weight, which has a melting point of approximately 70° C. (158° F.), which may be referred to as Wood's Metal, and which is sold under the tradenames CERROBEND™, BENDALLOY™, PEWTALLOY™, and MCP158™. This alloy material conforms to the inside of the tubes, allowing them to be bent as a solid structure.

In one embodiment, the supply tubes 312, 322, 332, and, when present, 342 are lubricated with an oil before they are filled with the eutectic alloy material. With the molten alloy material in place, the supply tube assembly 310 may be cooled with water to set, or crystallize, the alloy material. When the supply tube assembly 310 and the alloy material reach room temperature, the supply tube assembly 310 may be bent around a die to achieve the desired radius of curvature. Once the bend 370 is created, the alloy material may be removed from the conduit assembly 310 using steam, boiling water, or hot air. The alloy material may be recovered for subsequent reuse.

The bend 370 is located nearer to the upstream ends of the supply tubes 312, 322, 332, than to the downstream ends of the supply tubes 312, 322, 332. Said differently, the location of the bend 370 is proximate the upstream ends of the supply tubes 312, 322, 332.

Once the bend 370 is set, the upstream ends of the supply tubes 312, 322, 332 are joined to the fluid manifold hub 350, such that the supply tubes 312, 322, 332 are supported solely by the cartridge tip 400 (at their respective downstream ends) and the fluid manifold hub 350 (at their respective upstream ends). The joining of the upstream ends of the supply tubes 312, 322, 332 to the fluid manifold hub 350 may be accomplished by welding or brazing.

As discussed previously, the fluid manifold hub 350 may be provided with a first fluid inlet (e.g., the pilot fuel inlet 352) in flow communication with the first supply tube 312. The fluid manifold hub 350 may be provided with additional fuel inlets 354, 356, which provide liquid fuel (or a liquid fuel/water mixture) as separate fuel circuits to the second supply tube 322 and the third supply tube 332, respectively. The pilot fuel inlet 352 is provided upstream of the fuel inlet 354, and the fuel inlet 354 is provided upstream of the fuel inlet 356.

The methods and devices described herein facilitate the introduction of liquid fuel in the head end of a power-generating gas turbine combustor. More specifically, the methods and devices facilitate delivering liquid fuel (or a liquid fuel/water mixture) through a centrally located liquid fuel cartridge unit in such a way as to improve the distribution of the liquid fuel across the combustion zone without wetting the walls of the surrounding liner. Used in conjunction with a head end including unfueled bundled tube fuel nozzles, the air streams from the individual tubes help to atomize the liquid fuel and produce a stable diffusion flame.

Further, by introducing additional large jets as cross-flows into the combustion liner, via unfueled downstream fuel injectors, the combustion products produced by the diffusion flame assume the characteristics of a premixed flame, in terms of a greater degree of mixedness and a higher velocity than diffusion flames allowed to propagate unimpeded to the combustor exit.

The methods and devices therefore facilitate improving the overall operating efficiency of a combustor such as, for example, a combustor in a turbine assembly. This increases the turbine output. Moreover, the present fuel liquid fuel cartridge unit provides greater operational flexibility in that the combustor is configured to burn both liquid fuel and natural gas at different times.

Exemplary embodiments of the liquid fuel cartridge unit and methods of fabricating the same are described above in detail. The methods and devices described herein are not limited to the specific embodiments described herein, but rather, components of the methods and devices may be utilized independently and separately from other components described herein. For example, the methods and devices described herein may have other applications not limited to practice with turbine assemblies, as described herein. Rather, the methods and devices described herein can be implemented and utilized in connection with various other industries.

While the invention has been described in terms of various specific embodiments, those skilled in the art will recognize that the invention can be practiced with modification within the spirit and scope of the claims.

What is claimed is:

1. A liquid fuel cartridge unit for a gas turbine combustor, the cartridge unit comprising:
    a cartridge tip having an aft plate and a side wall circumscribing the aft plate;
    a first plurality of injection ports defined through the side wall;
    a second plurality of injection ports defined through the side wall in a different axial plane from the first plurality of injection ports;
    a third plurality of injection ports defined through the side wall in a different axial plane from the first plurality of injection ports and the second plurality of injection ports; and
    a plurality of nested conduits extending into the cartridge tip, the plurality of nested conduits including a first conduit, a second conduit, and a third conduit and defining therebetween respective flow passages, the first plurality of injection ports in fluid communication with a first flow passage defined by the first conduit, the second plurality of injection ports in flow communication with a second flow passage defined between the first conduit and the second conduit, and the third plurality of injection ports in flow communication with a third flow passage defined between the second conduit and the third conduit.

2. The cartridge unit of claim 1, wherein the first plurality of injection ports comprises fewer injection ports than the second plurality of injection ports.

3. The cartridge unit of claim 1, wherein each injection port of the first plurality of injection ports has a first size; wherein each injection port of the second plurality of injection ports has a second size; and wherein the first size is different from the second size.

4. The cartridge unit of claim 1, wherein the first conduit and the second conduit are joined, respectively, to a first supply tube and a second supply tube; and wherein the first supply tube and the second supply tube are nested and extend upstream from the cartridge tip.

5. The cartridge unit of claim 4, wherein the first flow passage is in flow communication with a source of pilot fuel via the first supply tube, and the second flow passage and is in flow communication with a source of liquid fuel via the second supply tube.

6. The cartridge unit of claim 1, wherein the second plurality of injection ports and the third plurality of injection ports are equal in number.

7. The cartridge unit of claim 3, wherein each injection port of the third plurality of injection ports has a third size; and wherein the third size is different from at least one of the first size and the second size.

8. The cartridge unit of claim 4, wherein the third conduit is joined to a third supply tube, the third supply tube surrounding the second supply tube and being in flow communication with a liquid fuel supply.

9. The cartridge unit of claim 1, wherein the plurality of nested conduits includes an air flow conduit surrounding the third conduit, such that an air flow passage is defined between the third conduit and the air flow conduit; and wherein the air flow conduit is joined to an air flow supply tube in flow communication with a supply of compressed air.

10. The cartridge unit of claim 9, wherein the aft plate defines therethrough a plurality of apertures in flow communication with the air flow passage defined by the air flow conduit.

11. The cartridge unit of claim 9, wherein at least one injection port of the first plurality of injection ports and the second plurality of injection ports is surrounded by an air vent, the air vent being in flow communication with the air flow passage defined by the air flow conduit.

12. A method of assembling a liquid fuel cartridge unit for a combustor, the method comprising:
    providing a liquid fuel cartridge tip having a plurality of nested conduits extending axially upstream therefrom;
    joining a downstream end of a first supply tube to a first conduit of the plurality of conduits;
    joining a downstream end of a second supply tube to a second conduit of the plurality of conduits, such that the second supply tube circumscribes the first supply tube;
    joining a downstream end of a third supply tube to a third conduit of the plurality of conduits, such that the third supply tube circumscribes the second supply tube and thereby forming a concentric tube assembly;
    bending the concentric tube assembly around a die at a bend location upstream of the cartridge tip;
    joining an upstream end of each of the first supply tube, the second supply tube, and the third supply tube to a fluid manifold hub;
    wherein the first supply tube, the second supply tube, and the third supply tube are supported solely by the cartridge tip and the fluid manifold hub.

13. The method of claim 12, wherein the joining of the downstream ends of the supply tubes to respective conduits is accomplished by welding or brazing; and wherein the joining of the upstream ends of the supply tubes to the fluid manifold hub is accomplished by welding or brazing.

14. The method of claim 12, wherein the bend location is proximate the upstream ends of the supply tubes.

15. The method of claim 12, further comprising filling the first supply tube, the second supply tube, and the third supply tube with a removable material prior to bending the concentric tube assembly.

16. The method of claim 15, further comprising removing the removable material after bending the concentric tube assembly.

17. The method of claim 12, further comprising providing the fluid manifold hub with a first fluid inlet in flow communication with the first supply tube, a second fluid inlet in flow communication with the second supply tube, and a third fluid inlet in flow communication with the third supply tube; and wherein the first fluid inlet is upstream of the second fluid inlet, and wherein the second fluid inlet is upstream of the third fluid inlet.

18. The method of claim 12, further comprising joining a downstream end of a fourth supply tube to a fourth conduit, the fourth supply tube surrounding the third supply tube; and wherein the fourth supply tube is in flow communication with a fourth fluid inlet provided in a mounting flange disposed downstream of the bend location.

* * * * *